United States Patent
Sole et al.

(10) Patent No.: US 9,214,030 B2
(45) Date of Patent: Dec. 15, 2015

(54) METHOD AND APPARATUS FOR PROCESSING VIDEO SEQUENCES

(75) Inventors: Joel Sole, Plainsboro, NJ (US); Yu Huang, Plainsboro, NJ (US); Joan Llach, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 410 days.

(21) Appl. No.: 12/451,264

(22) PCT Filed: Apr. 25, 2008

(86) PCT No.: PCT/US2008/005340
§ 371 (c)(1),
(2), (4) Date: Nov. 3, 2009

(87) PCT Pub. No.: WO2008/136933
PCT Pub. Date: Nov. 13, 2008

(65) Prior Publication Data
US 2010/0128789 A1    May 27, 2010

Related U.S. Application Data

(60) Provisional application No. 60/927,950, filed on May 7, 2007.

(51) Int. Cl.
*H04N 7/30* (2006.01)
*H04N 7/26* (2006.01)
*H04N 7/64* (2006.01)
*G06T 7/20* (2006.01)
*G06T 5/00* (2006.01)

(52) U.S. Cl.
CPC .............. *G06T 7/2006* (2013.01); *G06T 5/005* (2013.01); *G06T 2207/10016* (2013.01); *G06T 2207/20144* (2013.01)

(58) Field of Classification Search
None
See application file for complete search history.

(56) References Cited

U.S. PATENT DOCUMENTS 5,812,787 A * 9/1998 Astle ............................. 709/247
6,173,087 B1 * 1/2001 Kumar et al. ................. 382/284
(Continued)

FOREIGN PATENT DOCUMENTS

WO    WO2007076890    7/2007

OTHER PUBLICATIONS

Eun-Young Kang; Cohen, I.; Medioni, G., "A layer extraction system based on dominant motion estimation and global registration," Multimedia and Expo, 2004. ICME '04. 2004 IEEE International Conference on , vol. 1, No., pp. 551,554 vol. 1, 30—Jun. 30, 2004 URL: http://ieeexplore.ieee.org/stamp/stamp.jsp?tp=&arnumber=1394251&isnumber=30344.*

(Continued)

*Primary Examiner* — Christopher S Kelley
*Assistant Examiner* — Kaitlin A Retallick
(74) *Attorney, Agent, or Firm* — Robert D. Shedd; Reitseng Lin

(57) ABSTRACT

A method for processing a video sequence having a plurality of frames includes the steps of: extracting features from each of the frames, determining correspondences between the extracted features from two of the frames, estimating motion in the video sequence based on the determined correspondences, generating a background mosaic for the video sequence based on the estimated motion, and performing foreground-background segmentation on each of the frames based on the background mosaic.

18 Claims, 1 Drawing Sheet

(56) References Cited

U.S. PATENT DOCUMENTS

| | | | |
|---|---|---|---|
| 6,205,260 | B1 | 3/2001 | Crinon et al. |
| 6,249,613 | B1 | 6/2001 | Crinon et al. |
| 6,738,424 | B1* | 5/2004 | Allmen et al. ............ 375/240.08 |
| 2003/0012410 | A1* | 1/2003 | Navab et al. ................... 382/103 |
| 2003/0108238 | A1* | 6/2003 | Xu ................................ 382/173 |
| 2004/0223652 | A1* | 11/2004 | Cetin et al. .................... 382/235 |
| 2004/0252230 | A1* | 12/2004 | Winder ....................... 348/402.1 |
| 2005/0196020 | A1* | 9/2005 | Comaniciu et al. ............ 382/104 |
| 2006/0233423 | A1* | 10/2006 | Najafi et al. ................... 382/103 |
| 2006/0269097 | A1* | 11/2006 | Mihcak et al. ................. 382/100 |
| 2007/0003165 | A1* | 1/2007 | Sibiryakov et al. ............ 382/294 |
| 2007/0086675 | A1* | 4/2007 | Chinen et al. .................. 382/284 |
| 2008/0240616 | A1* | 10/2008 | Haering et al. ................ 382/294 |

OTHER PUBLICATIONS

Eun-Young Kang; Cohen, I.; Medioni, G., "A layer extraction system based on dominant motion estimation and global registration," Multimedia and Expo, 2004. ICME '04. 2004 IEEE International Conference on, vol. 1, No., pp. 551,554 vol. 1, 30—Jun. 30, 2004 URL: http://ieeexplore.ieee.org/stamp/stamp.jsp?tp=&arnumber=1394251 &isnumber=30344.*

Eun-Young Kang; Cohen, I.; Medioni, G., "A layer extraction system based on dominant motion estimation and global registration," Multimedia and Expo, 2004. ICME '04. 2004 IEEE International Conference on, vol. 1, No., pp. 551,554 vol. 1,30—Jun. 30, 2004 URL: http://ieeexplore.ieee.org/stamp/stamp.jsp?tp=&arnumber=1394251 &isnumber=30344.*

Hartley, Richard, and Andrew Zisserman. Multiple View Geometry in Computer Vision. Second ed. Cambridge UP, 2004. Print.*

Joel Sole, et al, "Mosaic-Based Figure—Ground Segmentation Along With Static Segmentation by Mean Shift", Thomson Corporate Research, Princeton, New Jersey, Aug. 2007.

Regis Crinon, et al, Sprite-Based Video Coding Using On-line Segmentation, IEEE, 1998, pp. 2981-2984.

Search report dated Aug. 23, 2008.

* cited by examiner

METHOD AND APPARATUS FOR PROCESSING VIDEO SEQUENCES

CROSS REFERENCE TO RELATED APPLICATION

This application claims the benefit, under 35 U.S.C. §365 of International Application PCT/US2008/005340, filed Apr. 25, 2008, which was published in accordance with PCT Article 21(2) on Nov. 13, 2008 in English and which claims the benefit of U.S. provisional patent application No. 60/927,950, filed May 7, 2007.

BACKGROUND OF THE INVENTION

1. Field of the Invention

The present invention generally relates to the field of video processing, and more particularly, to a method and apparatus for processing video sequences that addresses, among other things, problems related to background-foreground segmentation in video scenes.

2. Background Information

Moving object segmentation in video sequences is an important element in many applications, such as object-based video coding, video indexing and retrieval, and/or video event analysis and understanding. Various techniques are generally known in the art for dealing with moving object segmentation. One key point of these techniques is determining how to merge the spatial and temporal information of a video scene in order to properly segment each moving object. The present invention described herein addresses this and other topics related to the field of video processing.

SUMMARY OF THE INVENTION

In accordance with an aspect of the present invention, a method for processing a video sequence comprised of a plurality of frames is disclosed. According to an exemplary implementation, the method comprises the steps of: extracting features from each of the frames, determining correspondences between the extracted features from two of the frames, estimating motion in the video sequence based on the determined correspondences, generating a background mosaic for the video sequence based on the estimated motion, and performing foreground-background segmentation on each of the frames based on the background mosaic. An apparatus having circuitry capable of performing the aforementioned steps is also disclosed.

In accordance with another aspect of the present invention, an apparatus for processing a video sequence comprised of a plurality of frames is disclosed. According to an exemplary implementation, the apparatus comprises means for extracting features from each of the frames, means for determining correspondences between the extracted features from two of the frames, means for estimating motion in the video sequence based on the determined correspondences, means for generating a background mosaic for the video sequence based on the estimated motion, and means for performing foreground-background segmentation on each of the frames based on the background mosaic.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE EXEMPLARY IMPLEMENTATIONS

In this disclosure, various implementations that address a variety of problems and issues related to the field of video processing are proposed and described. Each section describes information relating to one or more of these implementations, and some implementations may be discussed in multiple sections. Further, this document is a unitary document, and the appearance of any particular information or implementation in a given section, or the failure to appear in a given section, does not limit the scope of this disclosure document or of the implementations, concepts, and aspects that are described herein.

I. Summary of at Least One Exemplary Implementation

At least one exemplary implementation of the present invention deals with the problem of background-foreground segmentation in video scenes. The goal in addressing this problem is to separate the background regions of video scenes from the foreground moving objects. A segmented foreground permits the adequate processing of these regions for the application at hand. Moving object segmentation in video sequences is an important element in many applications, such as object-based video coding, video indexing and retrieval, and/or object highlighting.

At least one exemplary implementation of the present invention makes use of several video processing techniques, including: local feature extraction and matching, robust motion estimation, background mosaic generation, mosaic back-projection, and segmentation. The overall system for this exemplary implementation is divided into the following five (5) stages:

1. Feature extraction on a frame-by-frame basis;
2. Feature matching: computation of correspondences between the features in two frames (e.g., consecutive frames, every X number of frames, etc.);
3. Global motion estimation of the video sequence;
4. Background mosaic generation; and
5. Final foreground-background segmentation.

Figure 1:
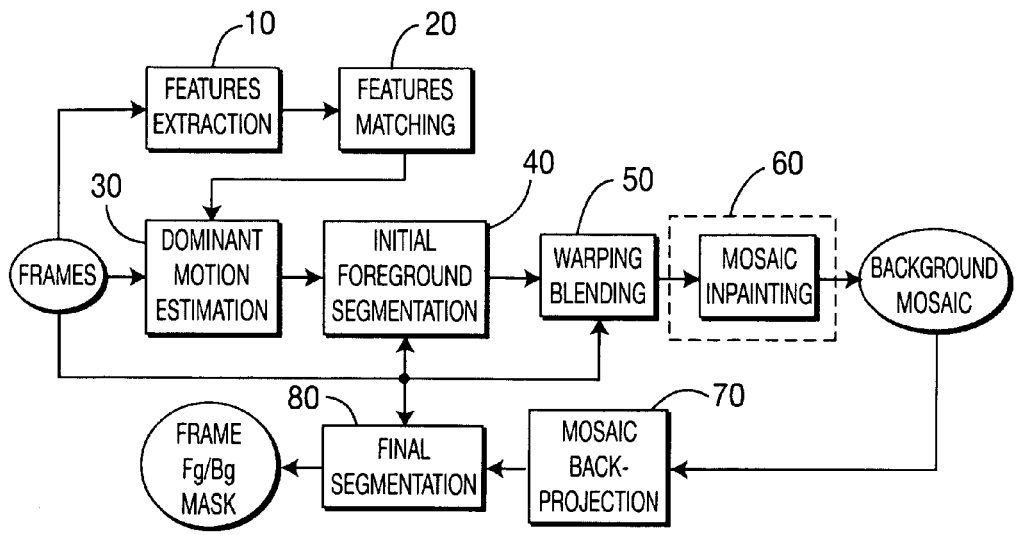
FIG. 1 is a diagram illustrating the various stages for processing video sequences according to an exemplary implementation of the present invention.

According to this exemplary implementation, Scale Invariant Feature Transform (SIFT) features are extracted from a video sequence in the first stage. Next, in the second stage, correspondences between consecutive frames, or every X number of frames, are matched. The matched features provide information to compute the video scene global motion in the third stage. Unfortunately, there are mismatches as well as the presence of error in the feature location. To face these drawbacks, a robust approach that employs a modified version of the RANdom SAmple Consensus (RANSAC) algorithm and weighted total least squares is employed in the third stage. Knowing the global motion permits initial foreground segmentation and the generation of a mosaic mainly using background data in the fourth stage. Finally, in the fifth stage, the moving object extraction is refined by combining the error of the mosaic back-projection into each frame along with a static segmentation of the frame with the mean shift algorithm. At the end of the fifth stage, the background has been separated from the foreground for each frame. Also, a mask has been generated to indicate the regions in the frames is which are static along the scene. As such, the moving objects in the frames may be readily identified. FIG. 1 is a diagram illustrating the aforementioned stages of the exemplary implementation, and will be described in greater detail later herein. It is noted that the aforementioned stages include at least the following elements of potential novelty:

1. A temporal consistency check in the feature matching stage;
2. Modifications are introduced in the RANSAC algorithm to improve its efficiency for the problem at hand;
3. The combination of the least-squares with the weighed total least squares approach for the perspective transform parameters estimation;
4. The inpainting of the background mosaic to fill the missing foreground regions with background information; and
5. The mean shift-based foreground segmentation method.

II. Overview of at Least One Problem that is Addressed by at Least One Implementation One of the key points of many techniques for performing foreground-background segmentation is how to merge the spatial and temporal information of a video scene in order to properly segment each moving object. Still images may be segmented considering given characteristics of each region, for instance, their color or texture. However, in a video sequence these regions are placed within the temporal context, that is, we determine which regions are moving with respect to some fixed background. Accordingly, the problem is twofold:

1. Find which areas in one frame correspond to the same area in other frames; and
2. Find what regions are background and determine what regions are moving regions.

A generic approach to solve this problem is based on the construction of a background mosaic. A mosaic is an image constructed from all frames in a scene sequence, giving a panoramic view of the scene. All the frames are put in the same coordinate system and merged to produce a single image, that is, the mosaic. A pixel in the mosaic arises from the pixels of all the frames that have a pixel at that given position. Usually, several frames coincide in a given mosaic pixel because the degree of overlap between frames is high. The weighted mean or median of the set of frame pixels is selected as the mosaic pixel. By construction, this leads to a mosaic image which is mainly composed of background pixels, since background pixels appear more often at a given position than moving objects.

Once the background mosaic is created, the process of extracting the foreground of each frame is conceptually straightforward: the frame and the mosaic are compared and the regions which are similar are all background, since the mosaic is composed of background. Consequently, the rest of the regions, which are different between both images, are the foreground. At the end, the result is a mask indicating to what type of region each pixel belongs.

The aforementioned approach has several potential difficulties:

1. All the frames are placed in a single reference. This implies to accurately find the global motion between frames and to warp them accordingly.
2. Blending the frames to form the mosaic. This step should preferably avoid the selection of foreground pixels for the mosaic.
3. Decide the exact foreground-background mask once the to difference between the mosaic and the frame is obtained. The simple thresholding of the error typically leads to inaccurate results with noise and false detected areas.

In view of the foregoing difficulties, a different solution is desired. According to at least implementation of the present invention, the first problem above is addressed by means of the SIFT feature extraction and matching and then, estimating the global motion of the matches by means of a modified RANSAC algorithm. The second problem above is addressed by means of a median filter and an initial segmentation. The last problem above is addressed by means of final mean shift-based segmentation.

III. General Discussion of Various Frameworks Related to the Present Invention

A. The System

As previously indicated herein, moving object segmentation in video sequences is an important element in many applications such as object-based video coding, video indexing and retrieval, or object highlighting. One method for the detection and extraction of foreground regions follows. Images are registered estimating an increasingly complex motion model through different resolution levels. Then, the foreground is detected by a motion measure and a reliability score on the measure. Finally, the detected objects are tracked through the sequence by temporal integration.

Another method starts by a simple rough motion segmentation of the moving foreground regions, which are masked. Afterwards, background regions are used to compose a large mosaic image. The mosaic includes all the background in one scene. In a second stage, the initial foreground regions are detected by the differential signal between original image and the reconstructed background image from the mosaic. The initial detected foreground is further divided into many homogeneous texture regions in terms of image spatial correlations. Merging and refining of texture regions eventually form the boundaries of foreground.

At least one particular implementation uses the same main blocks. However, the implementation uses SIFT features for matching consecutive frames. Also, we introduce robust estimation methods. The final segmentation methods are very different than what are proposed herein.

Another method extracts foreground based on mosaic generation. According to this method, the motion estimation is pixel-based instead of feature based. The estimation algorithm is the Levenberg-Marquardt. A weight map of the pixels in the current frame that do not follow the dominant motion is created. This map is filtered using morphological connected operators to eliminate outliers. The mosaic is generated iteratively, including a new frame at a time. The current image is warped with the mosaic with a 4-vertices displacement (4VD) motion estimation algorithm. Finally, the mosaic is updated with the current frame by blending the warped image with the mosaic taking into account the weight maps.

B. SIFT Features in Motion Estimation

In the first stage of one implementation of the present invention, the SIFT features are extracted from each frame. SIFT features are distinctive and repeatable, so the same feature can be found in temporal consecutive frames. Matching these features and extracting their relative position within the frames permit to estimate the global motion. Local features (and specifically SIFT) may be included in motion estimation/image matching applications. In one method, such features are used to construct a panorama from a set of images of a scene. Robotic navigation algorithms may employ SIFT to create a map of the terrain. SIFT is also used in at least one method for estimating the motion of autonomous vehicles.

C. The Temporal Consistency

The matching step of at least one implementation of the present invention is based on the Euclidean distance of the SIFT features and on their temporal consistency. Matched features with high probability to be correct are retained for the motion estimation step. However, there still exists some amount of incorrect matches. Indeed, the correct matches tend to have some amount of error in the location. Both drawbacks affect the motion estimation step. Because the SIFT features have not been used before to construct a mosaic of a scene, there are no works checking their temporal feature consistency.

D. RANSAC-Type Algorithms

As previously indicated herein, RANSAC is an abbreviation for "RANdom SAmple Consensus". The RANSAC algorithm is used to estimate parameters of a mathematical model from a set of observed data which contains outliers. The input to the RANSAC algorithm is a set of observed data values, a parameterized model which can explain or be fitted to the observations, and some confidence parameters. RANSAC is robust in the sense of good tolerance to outliers in the experimental data. RANSAC achieves its goal by iteratively selecting a random subset of the original data points. These points are hypothetical inliers and this hypothesis is then tested as follows. A model is fitted to the hypothetical inliers, that is, all free parameters of the model are reconstructed from the point set. All other data points are then tested against the fitted model, i.e., for every point of the remaining set, the algorithm determines how well the point fits to the estimated model. If it fits well, that point is also considered as a hypothetical inlier. If sufficiently many points have been classified as hypothetical inliers relative to the estimated model, then we have a model which is reasonably good. However, it has only been estimated from the initial set of hypothetical inliers, so we re-estimate the model from the entire set of point's hypothetical inliers. At the same time, we also estimate the error of the inliers relative to the model.

The aforementioned procedure is then repeated a fixed number of times, each time producing either a model which is rejected because too few points are classified as inliers, or a refined model together with a corresponding error measure. In the latter case, we keep the refined model if its error is lower than the last saved model. Table 1 below shows the RANSAC algorithm.

TABLE 1

The RANSAC Algorithm

1: Given C - matched features set
2: Given n - the minimum number of data values required to fit the model
3: Given k - the maximum number of iterations
4: Given t - a threshold value for determining when a data point fits a model
5: Given d - the number of inliers required to assert that a model fits well to data
6:　for h = 1 to k do
7:　　Select minimal set Sh of n matches at random
8:　　Derive motion hypothesis Mh with the matches Sh
9:　　for all matches in C do
10:　　　Transform point and find matching residual rhi
11:　　　if rhi < t then
12:　　　　Include point as an inlier of model Mh TABLE 1-continued The RANSAC Algorithm 13:　　　end if
14:　　end for
15:　　if |Mh| > d and the largest so far then
16:　　　Derive model Mh' with all the inliers of Mh
17:　　　Retain Mh' and update k
18:　　end if
19: end for The RANSAC algorithm is proposed to deal with the presence of outliers. The output is the estimated model, and it is only correct with a certain probability, since RANSAC is a randomized algorithm. The theoretical value of this probability is overoptimistic, since with noisy data it is not enough to generate a sample composed only of inliers; they must be inliers that span the object, so that the remaining matches are compared with interpolated rather than extrapolated values. According to an exemplary implementation of the present invention, and as will be described later herein, the RANSAC algorithm is improved to include the following characteristics:

1. Bucket-based sampling selection. Instead of selecting samples entirely at random, select them from different buckets (areas in the image), thus avoiding spatially correlated error and outliers coming from the same foreground region.

2. Iterative model estimation. Instead of computing the model from a set of samples, iterate the model estimation several times including all the inliers each time. This avoids generating a model only from spatially close samples.

The RANSAC algorithm uses an implicit metric: the number of inliers. The best model is the one that maximizes the number of inliers. This metric can be quite coarse. It may be improved if additional knowledge on the data distribution is available:

3. Maximum likelihood estimation. The data likelihood may be a better model. Various assumptions include that the inlier error distribution is gaussian and that the outliers follow a uniform distribution. The probability mixing parameters is estimated with the expectation-maximization algorithm. The approach seeks for the model that maximizes the data likelihood.

RANSAC is a generic algorithm that can be improved for particular cases in accuracy, efficiency, and speed. As will be described later herein, we adopt an approach based on iterative model estimation and include a couple of modifications to the algorithm shown in Table 1 to further adapt the algorithm to the data.

E. Least-Squares and Variants

According to at least one implementation of the present invention, the model fitted by the RANSAC algorithm is the 2-D perspective motion model. This parametric model expresses the mapping of points in the reference plane $(x_i, y_i)$ to the transformed position in the actual plane $(x_{0i}, y_{0i})$, for $i = 0 \ldots n-1$. The perspective transform is nonlinear, has 8 parameters, and is governed by the equations below:

$$x_{0i} = (m_0 x_i + m_1 y_i + m_2)/(m_6 x_i + m_7 y_i + 1)$$

$$y_{0i} = (m_3 x_i + m_4 y_i + m_5)/(m_6 x_i + m_7 y_i + 1)$$

We estimate the 8 perspective model parameters. A set of features in two frames are found and matched. The correct matches have some error in the position estimation. We want to obtain the parameters $m_j$ for $j = 0 \ldots 7$ that minimize the quadratic error, i.e., the Euclidean distance. However, this is a nonlinear problem with respect to $m_j$. The iterative Levenberg-Macquart method is commonly used to solve this problem. The drawback is that Levenberg-Macquart is an iterative algorithm, and it is nested into another iterative algorithm, that is, the RANSAC algorithm. Therefore, the computational cost is typically quite high.

One solution to the foregoing problem is to simplify the problem modifying the objective function to an algebraic linear function Ea. In practice, this objective is similar to the Euclidean distance, since parameters m6 and m7 usually are very small compared to 1. Differentiating Ea with respect to mj leads to a linear set of functions Ax=b that may be solved by means of the least-squares (LS). This approximation is fairly good in most of the situations and the computational cost is kept under control. However, there is a flaw that has been omitted for some time. The feature detection introduces error in the location of the interest points, that is, there are errors in b, but also in A. In other words, the measurement errors are not only in the independent term. Therefore, what we really want to minimize is the Frobenius norm of the errors in matrix A and in vector b at the same time. This is the total least squares (TLS) problem, which is well documented.

Let matrix C be the concatenation matrix C=(A b). The TLS solution is given by the singular value decomposition of matrix C, that is, C=U*S*V, where U and V are orthonormal matrices, containing the left and right singular vectors, respectively, and S is a diagonal matrix containing the singular values. The solution is given by the singular vector vmin of V corresponding to the minimum singular value. Matrix Delta C is the error of matrix C, such that it provides the TLS solution. The TLS typically provides a better model of our specific problem than the LS, but it does not take into account the particular structure of matrix C:

1. The elements containing 0s and 1s in the matrix are not subject to any noise or error. They are not data, just multiplying factors that are known and fixed.

2. The error is correlated. Columns are tightly related and so, their possible error.

These facts should be considered in a proper formulation of the problem. There are approximate formulations that assume zero-mean gaussian noise. However, the SIFT feature location error does not follow a gaussian distribution; it tends to be correlated with the main motion displacement. We deal with these facts using a TLS with a weighting matrix D with appropriate weights. This is the weighting total least squares (WTLS).

F. Mean Shift-Based Foreground Segmentation

The final step (in at least one implementation) for foreground segmentation could use most of the available still image segmentation methods. For instance, a watershed over-segmentation could be used, followed by a spatially similarity measure for merging similar regions. The use of mean shift permits the explicit introduction in the segmentation method of the spatial and color range of each segmented region.

IV. Further Description of One or More Implementations

An overall view of the approach of at least one implementation of the present invention has been previously provided herein in Section I. As previously indicated in Section I, the overall system for at least one exemplary implementation is divided into the following five (5) stages:

1. Feature extraction on a frame-by-frame basis;
2. Feature matching: computation of correspondences between the features in two frames (e.g., consecutive frames, every X number of frames, etc.);
3. Global motion estimation of the video sequence;
4. Background mosaic generation; and
5. Final foreground-background segmentation.

FIG. 1 illustrates the aforementioned stages of the exemplary implementation. It is noted that the individual elements of FIG. 1 may correspond to method and/or apparatus elements. In this manner, FIG. 1 may represent both a flowchart of method steps, as well as structural elements of an apparatus. The method represented in FIG. 1 may, for example, be implemented using computer software code that is stored and/or executed using one or more integrated circuits (ICs). In the following, we describe our solution to the aforementioned stages with reference to FIGS. 1-3, as well as at least some of the potential novelties introduced in each of them, including:

1. A temporal consistency check in the feature matching stage in order to eliminate mismatches;
2. Modifications introduced in the RANSAC algorithm to improve its efficiency for our problem;
3. The combination of the least-squares with the weighed total least squares approach for the perspective transform parameters estimation. The WTLS provides a more accurate estimation;
4. The background mosaic inpainting to fill the missing foreground regions with background information to generate a more useful background; and
5. The mean shift-based foreground segmentation method to obtain the final foreground segmentation for each frame.

A. Feature Extraction and Matching

Figure 2:
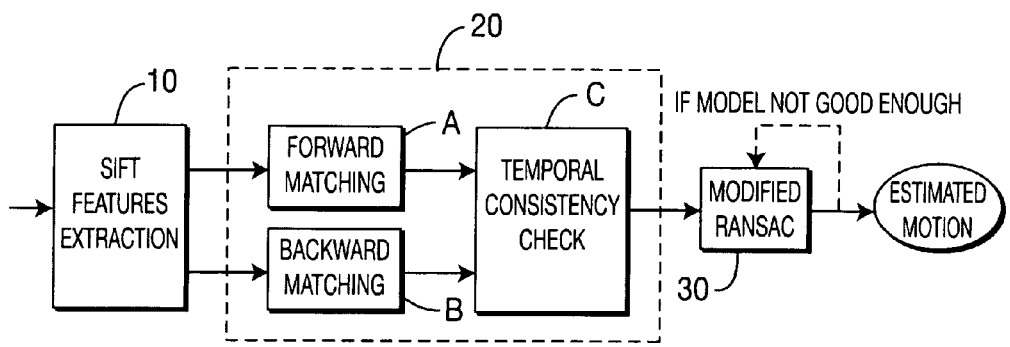
FIG. 2 is a diagram illustrating further details of certain stages of FIG. 1 according to an exemplary implementation of the present invention.
Figure 3:
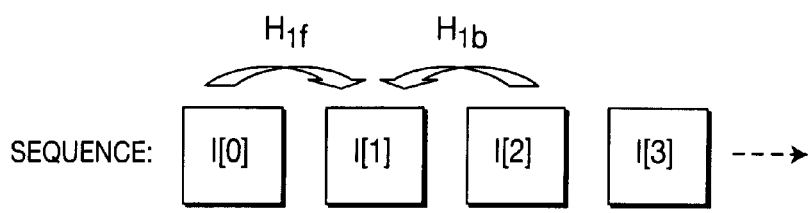
FIG. 3 is a diagram illustrating bi-directional warping according to an exemplary implementation of the present invention.

This section corresponds to elements 10 and 20 of FIGS. 1 and 2. Here, we are interested in extracting distinctive invariant features from images that can be used to deal with reliable matching between different views of an object or scene, motion tracking, and eventually, object recognition. Video sequences may impose high variability in the objects appearing in a scene. Therefore, we would like the features to be highly robust to several image modifications like affine distortion, change in 3-D viewpoint, change in illumination, and addition of noise. Other desired characteristics for a feature are distinctiveness, repeatability, and conciseness.

SIFT features meet a good amount of these requirements. They are well localized in the spatial and frequency domains, reducing the probability of disruption by occlusion, clutter, or noise. Basically, the extraction process looks for the local peaks in the scale-space domain. Then, it selects only those peaks that are likely to remain stable over image deformations. Finally, the points are described by a representation (set of orientation histograms) that is distinctive, concise, and invariant over transformations. A feature generated from SIFT typically has 128 parameters.

Matching a feature to a set of features may be computed by the nearest neighbor, defined as the descriptor vector at a minimum Euclidean distance. This approach requires modifications to deal with practical issues since a global threshold on distance to the closest feature performs badly: there are matches that have no real correspondence, but in fact matches appear due to background clutter. An effective measure is obtained by comparing the distance of the closest neighbor to that of the second-closest neighbor. The measure performs well because correct matches need to have the closest neighbor significantly closer than the closest incorrect match to achieve reliable matching.

The search of the nearest neighbor in high dimensional spaces is computationally expensive. The exhaustive search have a complexity of O(n2). A computational cost/efficiency trade-off is required. We use the best-bin-first algorithm, which returns the closest neighbor with high probability while speeding up the search to O(n log n). Many matches are incorrect due to ambiguous features and to features arising from background clutter. We attempt to reduce the amount of mismatches by checking the temporal consistency of each match in both temporal directions. FIG. 2 highlights with a dashed rectangle several of the features (i.e., elements A-C) discussed.

A match is accepted if it is found in the correspondences set of the features from frame i to features in frame i+1 and vice versa, i.e., it is also found in the correspondences from i+1 to i. Additionally, the temporal consistency can be extended to check the matches between frames i−1 and i. A match found in 3 consecutive frames and in both temporal directions has much less probability to be a mismatch than a regular match.

B. RANSAC-Type Algorithm

This section corresponds to element 30 of FIGS. 1 and 2. As previously indicated herein, the RANSAC algorithm is used to estimate parameters of a mathematical model from a set of observed data which contains outliers. According to at least one implementation of the present invention, the RANSAC algorithm of Table 1 is modified to as shown in Table 2 below.

TABLE 2

Modified RANSAC algorithm

1: Given C - matched features set
2: Given n - the minimum number of data values required to fit the model
3: Given k - the maximum number of iterations
4: Given t - a threshold value for determining when a data point fits a model
5: Given d - the number of inliers required to assert that a model fits well to data
6: Given s - a threshold on the number of matches for choosing the estimation method
7: while solution Mh0 is NOT obtained do
8:    for h = 1 to k do
9:       Select minimal set Sh of n matches at random
10:      for i = 1 to n iterations do
11:        if |Sh| < s then
12:         Derive motion hypothesis Mh with matches Sh using LS
13:        else
14:         Derive motion hypothesis Mh with matches Sh using WTLS
15:        end if
16:        Sh =0
17:        for all matches in C do
18:         Transform point and find matching residual rhi
19:         if rhi < t then
20:          Include point in Sh as an inlier of model Mh
21:         end if
22:        end for
23:      end for
24:      If |Mh| > d and the largest so far then
25:       Derive model Mh' with all the inliers of Mh
26:       Retain Mh' and update k
27:      end if
28:    end for
29:    Increase t
30: end while In Table 2 above, a modification introduced in the RANSAC algorithm of Table 1 is the iteration of the model estimation within the loop starting in line 6 of the algorithm in Table 1. Instead of computing the model only from the minimum number of required samples (line 8 of the algorithm in Table 1), the model is re-estimated several times including all the inliers obtained so far (as in line 16 in Table 1). This avoids generating a model from spatially close samples: more inliers that are spatially separated are included in the motion estimation, giving faster and more reliable results. The RANSAC algorithm of Table 2 is also modified in the following ways:

1. The model is modified to reach a good accuracy given the data available. RANSAC fails to provide a solution with certain probability. We impose strict constraints to the algorithm and each time it fails the constraints are relaxed. This is done by tuning the parameter t, i.e., the threshold value for determining when a data point fits a model. First, we impose a precision of $\frac{1}{20}$ of pixel accuracy to fit the model. Then, if RANSAC does not reach a solution, the parameter t is increased by $\frac{1}{50}$ and RANSAC is run again. This process is iterated until solution (usually, 1 to 3 iterations are enough).

2. The motion hypothesis is derived with a different method depending on the number of available points. The LS or the WTLS explained later are used. Typically, LS is faster and gives good results for fewer points. Typically, WTLS gives more accurate estimations in presence of noise, but it is less stable when few points are used. Therefore, we use the LS when less than 10 points are used to compute Mh, and the WTLS otherwise.

C. LS-WTLS Parametric Motion Estimation

This section corresponds to element 30 of FIG. 1. Here, we deal with the problems of using a TLS with a weighting matrix D that penalizes more the error in certain columns. In order to consider the variable influence of the different errors, matrix deltaC may be weighted by two diagonal matrices $D = \mathrm{diag}(d0, d1, \ldots, dn)$ and $E = \mathrm{diag}(e0, e1, \ldots, e8)$. Thus, the problem can be expressed as:

Minimize $\|D\, \mathrm{delta}C\, E\|$ subject to $(C + \mathrm{delta}C)m0 = 0$

This is the weighted TLS, and its solution is:

$m\mathrm{WTLS} = -\mathrm{diag}(e0, e1, \ldots, e7) * (v\mathrm{min}, 0\, v\mathrm{min}, 1\, \ldots\, v\mathrm{min}, 7) / (v\mathrm{min}, 8\, e8)$ Matrix D weights are chosen according to the following criteria. Firstly, note that there are two columns in matrix A that are composed only of 0s and 1s. These values are known parameters not subject to error, so we penalize the variations in these columns in deltaC with a factor of 4. Secondly, there are two columns that their elements are the multiplication of two point locations, so errors are multiplied. To keep these errors under control, both columns are penalized with a weight of 2. The rest of the columns are equally weighted to 1. A more precise method would model the error distribution and consider an approximation of the error correlation. We have tested this approach but the resulting algorithm is more complex, while the results are similar to the WTLS. To sum up, the WTLS is quite simple and accurate, stable, and works well. Accordingly, we use WTLS for motion estimation and a particular implementation of matrix D has been described for our particular problem.

D. Background Mosaic Generation

This section corresponds to elements 40, 50 and 60 of FIG. 1. According to at least one implementation, the background mosaic generation algorithm is divided into the following steps:

1. Warping matrix. The warping matrix from one frame to another is obtained by the global motion estimation. Two matrices are used in order to distinguish background from foreground. In this way, the motion in three consecutive frames is considered through two transform matrices: the forward warping matrix Hif and the backward warping matrix Hib (see FIG. 3).

2. Warping error. The warping error highlights the regions not following the global motion. These regions have their own motion and are considered foreground. The forward warping error in frame i is $\mathrm{eif} = \|li - \mathrm{Hif}(li-1)\|$ and the backward warping error is $\mathrm{eib} = \|li - \mathrm{Hib}(li+1)\|$.

3. Foreground/Background mask generation. A first approximation to foreground is obtained by thresholding the two warping errors and then applying the AND logical operation to combine both results. The resulting mask is regularized with a morphological opening.

4. Mosaic construction. A common coordinate system for the scene is established to be the first frame coordinates. Then, all the other frames are mapped to this coordinate system by applying matrix $$Mi = \prod_{j=i-1}^{0} H_{jb}.$$

Once all the frames are in the same coordinate system, a pixel in the mosaic is generated by pixels coming from the backgrounds of several frames. The final mosaic pixel is chosen to be the median of all the pixels mapped to the same mosaic location.

The mosaic is an image that should include all or majority of the background pixels in all of the frames. As such, a mosaic may contain more pixels than a frame.

The mosaic may contain missing regions due to the fact that only moving foreground regions are detected (observed) over the area during the whole sequence. For instance, this may happen for a short sequence resulting in some areas that are never seen as background. There is a lack of information within these areas that may damage the final foreground extraction. To avoid this, we complete the mosaic by inpainting the missing regions from the surrounding regions (see element 60 in FIG. 1). In this way, the known background information is extended to the missing parts, providing useful information for the upcoming stage that compares each frame to the background mosaic. Note that the inpainting stage is required and works because the initial foreground/background segmentation is performed and then the mosaic is constructed only from the pixels detected as background.

By these means, foreground data is first discarded by the mask generated in step 3 above, and then it is refilled in the mosaic with background information. Therefore, our background mosaic contains less foreground information, avoiding most of the ghost-like artifacts that appear in other approaches.

E. Foreground Extraction

This section corresponds to elements 70 and 80 of FIG. 1. Here, each frame is processed to extract its foreground. The inverse of matrix Mi is applied to back-project the mosaic to frame i coordinates. Roughly, the result is an image containing only frame i background. The difference between both images is the mosaic warping error, which mostly highlights the foreground regions. We segment the frame foreground regions using a mean shift based method and the information given by the mosaic, the mosaic warping error, and the frame. The method is described in the following.

The frame and the error are smoothed with a low pass gaussian filter to better segment each foreground region and to reduce the noise influence. The frame is segmented using the mean shift method. The mean shift parameters are tuned to have small spatial and color windows. This choice leads to obtain small regions with pixels having a similar color. In this way, we ensure that all the pixels in the region belong to the same object. Warping error is also oversegmented with mean shift. The goal of these segmentations is to decide the membership to foreground in a region basis, which is more reliable than a pixel-based decision.

The combination of the temporal information coming from the mosaic warping error and the spatial information from the frame is done as follows. For each segmented region in the frame, we compute the underlying mean error and variance in the mosaic warping error image. If the error exceeds a threshold, then the region is set to foreground, otherwise it is background. We also take into account the variance by checking whether it is lower to a threshold. The reason behind this check is that highly textured regions that are not perfectly warped show high errors in the pixels at the edge and low error in the rest. Considering the mean and variance of the error allows keeping the foreground, while eliminating almost all the background.

We thus provide one or more implementations having particular features and aspects. However, features and aspects of described implementations may also be adapted for other implementations. For example, the implementations described contain various thresholds and tradeoffs that may be varied in other implementations. Accordingly, although implementations described herein may be described in a particular context, such descriptions should in no way be taken as limiting the features and concepts to such implementations or contexts.

The implementations described herein may be implemented in, for example, a method or process, an apparatus, or a software program. Even if only discussed in the context of a single form of implementation (for example, discussed only as a method), the implementation or features discussed may also be implemented in other forms (for example, an apparatus or program). An apparatus may be implemented in, for example, appropriate hardware, software, and/or firmware. The methods may be implemented in, for example, an apparatus such as, for example, a computer or other processing device. Additionally, the methods may be implemented by instructions being performed by a processing device or other apparatus, and such instructions may be stored on a computer readable medium such as, for example, a CD, or other computer readable storage device, or an integrated circuit.

As should be evident to one of skill in the art, implementations may also produce a signal formatted to carry information that may be, for example, stored or transmitted. The information may include, for example, instructions for performing a method, or data produced by one of the described implementations. For example, a signal may be formatted to carry as data segmentation information produced by a described implementation, or an encoding of an image in which the encoding is based on segmentation information provided by a described implementation. Additionally, many implementations may be implemented in one or more of an encoder, a decoder, a pre-processor, or a post-processor. Further, other implementations are contemplated by this disclosure. For example, additional implementations may be created by combining, deleting, modifying, or supplementing various features of the disclosed implementations.

The following list provides a short list of various implementations. The list is not intended to be exhaustive but merely to provide a short description of a small number of the many possible implementations.

1. Performing feature extraction in a frame by frame basis, using at least one of the described implementations.

2. Performing feature matching using computation of correspondences between the features in two consecutive frames, according to at least one of the described implementations.

3. Performing global motion estimation of the video sequence, using at least one of the described implementations.

4. Performing background mosaic generation, using at least one of the described implementations.

5. Performing final foreground-background segmentation, using at least one of the described implementations.

6. Performing background-foreground segmentation in video scenes using a process that includes at least the following aspects, according to at least one described implementation:
   a. feature extraction in a frame by frame basis;
   b. feature matching using computation of correspondences between the features in two consecutive frames;
   c. global motion estimation of the video sequence;
   d. background mosaic generation; and
   e. final foreground-background segmentation.

7. An apparatus, device and/or system (such as, for example, an encoder, a decoder, a pre-processor, or a post-processor) capable of operating according to, or in communication with, one of the described implementations.

8. An apparatus, device and/or system (such as, for example, a computer readable medium) for storing a set of instructions or data produced by a set of instructions (such as, for example, segmentation information or an encoding produced based on segmentation information).

9. A signal formatted to include a set of information, such as, for example, a set of instructions, or data produced by a set of instructions. The signal may, for example, represent digital information, an electromagnetic wave and/or a baseband signal.

One or more of the implementations described herein may also be applicable to specific projects, including:

1. The Object Highlighting Project in which moving objects in a video scene are detected and enhanced in order to better preserve them through compression.

2. Background-foreground segmentation can be applied to an encoder by providing it a mask of the foreground regions.

3. Post-production for region-based processing.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for processing a video sequence comprised of a plurality of frames, said method comprising:
   extracting a feature from each of said frames;
   determining correspondences between said extracted feature from said frames;
   determining motion in said video sequence based on said determined correspondences, said determining motion using a modified random sample consensus algorithm that selects samples from buckets, iterates a model estimation multiple times including all inliers obtained so far in each iteration, and finds a model that maximizes a data likelihood, wherein a motion hypothesis is derived with a least squares method when the obtained inliers are determined to be less than a number, and the motion hypothesis is derived with a weighted total least squares method otherwise;
   generating a forward warping matrix and a background warping matrix for each of said frames based on said determined motion;
   generating a forward warping error and a backward warping error for each of said frames based on said forward warping matrix and said background warping matrix;
   generating a foreground/background mask for each of said frames based on said forward warping error and said backward warping error; and
   generating a background mosaic by mapping said frames to a common coordinate system; and
   extracting foreground information from each of said frames based on said background mosaic.

2. The method of claim 1, wherein said feature extracting step includes extracting a scale invariant feature transform feature.

3. The method of claim 1, wherein said determining correspondences step includes checking for temporal consistency of said extracted feature along said frames.

4. The method of claim 1, wherein said generating a background mosaic step further includes inpainting missing regions of said video sequence from surrounding regions of said video sequence.

5. The method of claim 1, wherein said foreground information extracting step includes extracting said foreground information using a mean shift method.

6. An apparatus for processing a video sequence comprised of a plurality of frames, said apparatus comprising:
   a processor configured to extract a feature from each of said frames, to determine correspondences between said extracted feature from said frames, to determine motion in said video sequence based on said determined correspondences, said determination of motion being performed using a modified random sample consensus algorithm that selects samples from buckets, iterates a model estimation multiple times including all inliers obtained so far in each iteration, and finds a model that maximizes a data likelihood, wherein a motion hypothesis is derived with a least squares method when the obtained inliers are determined to be less than a number, and the motion hypothesis is derived with a weighted total least squares method otherwise, to generate a forward warping matrix and a background warping matrix for each of said frames based on said determined motion, to generate a forward warping error and a backward warping error for each of said frames based on said forward warping matrix and said background warping matrix, to generate a foreground/background mask for each of said frames based on said forward warping error and said backward warping error, and to generate a background mosaic by mapping said frames to a common coordinate system, and to extract foreground information from each of said frames based on said background mosaic.

7. The apparatus of claim 6, wherein said processor is further configured to extract a scale invariant feature transform feature.

8. The apparatus of claim 6, wherein said processor is further configured to check for temporal consistency of said extracted feature along said frames.

9. The apparatus of claim 6, wherein said processor is further configured to inpaint missing regions of said video sequence from surrounding regions of said video sequence.

10. The apparatus of claim 6, wherein said processor is further configured to extract said foreground information using a mean shift method.

11. An apparatus for processing a video sequence comprised of a plurality of frames, said apparatus comprising circuitry configured to perform:
   extracting a feature from each of said frames;
   determining correspondences between said extracted features from said frames;
   determining motion in said video sequence based on said determined correspondences, said determining using a modified random sample consensus algorithm that selects samples from buckets, iterates a model estimation multiple times including all inliers obtained so far in each iteration, and finds a model that maximizes a data likelihood, wherein a motion hypothesis is derived with a least squares method when the obtained inliers are determined to be less than a number, and the motion hypothesis is derived with a weighted total least squares method otherwise;

generating a forward warping matrix and a background warping matrix for each of said frames based on said determined motion;

generating a forward warping error and a backward warping error for each of said frames based on said forward warping matrix and said background warping matrix;

generating a foreground/background mask for each of said frames based on said forward warping error and said backward warping error; and generating a background mosaic by mapping said frames to a common coordinate system; and extracting foreground information from each of said frames based on said background mosaic.

12. The apparatus of claim 11, wherein said feature extracting step includes extracting a scale invariant feature transform feature.

13. The apparatus of claim 11, wherein said determining correspondences step includes checking for temporal consistency of said extracted features along said frames.

14. The apparatus of claim 11, wherein said generating a background mosaic step further includes inpainting missing regions of said video sequence from surrounding regions of said video sequence.

15. The apparatus of claim 11, wherein said foreground information extracting step includes extracting said foreground information using a mean shift method.

16. The method of claim 1, wherein the modified random sample consensus algorithm iterates until a constraint parameter is met.

17. The method of claim 16, wherein the constraint parameter is relaxed after each iteration.

18. The method of claim 16, wherein the constraint parameter is a threshold value for determining when a data point fits a model.

* * * * *